United States Patent
Oyama et al.

(10) Patent No.: US 11,539,048 B2
(45) Date of Patent: Dec. 27, 2022

(54) NEGATIVE ELECTRODE, BATTERY, AND METHOD OF PRODUCING NEGATIVE ELECTRODE

(71) Applicant: TOYOTA JIDOSHA KABUSHIKI KAISHA, Toyota (JP)

(72) Inventors: Yutaka Oyama, Toyota (JP); Naoto Onodera, Kobe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 16/587,629

(22) Filed: Sep. 30, 2019

(65) Prior Publication Data

US 2020/0106101 A1  Apr. 2, 2020

(30) Foreign Application Priority Data

Oct. 1, 2018 (JP) .............................. JP2018-186708

(51) Int. Cl.
| | |
|---|---|
| *H01M 4/62* | (2006.01) |
| *H01M 4/587* | (2010.01) |
| *H01M 4/58* | (2010.01) |
| *H01M 4/134* | (2010.01) |
| *H01M 4/02* | (2006.01) |

(52) U.S. Cl.
CPC .......... *H01M 4/621* (2013.01); *H01M 4/134* (2013.01); *H01M 4/587* (2013.01); *H01M 4/5825* (2013.01); *H01M 2004/027* (2013.01)

(58) Field of Classification Search
CPC .... H01M 4/134; H01M 4/1393; H01M 4/133; H01M 4/13; H01M 4/366; H01M 4/587; H01M 4/5825; H01M 4/621; H01M 4/62; H01M 4/622; H01M 4/667; H01M 2004/027; Y02E 60/10

See application file for complete search history.

(56) References Cited

U.S. PATENT DOCUMENTS

| | | | |
|---|---|---|---|
| 2008/0063939 A1 | 3/2008 | Ryu et al. | |
| 2014/0248537 A1* | 9/2014 | Hayashi | ................ H01M 4/625 429/217 |
| 2018/0151869 A1 | 5/2018 | Matsuhara et al. | |

FOREIGN PATENT DOCUMENTS

| | | | | |
|---|---|---|---|---|
| CN | 103236545 | * | 8/2013 | ............ H01M 4/133 |
| CN | 103236545 A | | 8/2013 | |
| EP | 3565031 A1 | | 11/2019 | |
| JP | 10-106542 A | | 4/1998 | |
| JP | H10106542 | * | 4/1998 | ............ H01M 10/05 |
| JP | 200871757 A | | 3/2008 | |
| JP | 2014086285 | * | 5/2014 | .............. H01M 4/13 |

(Continued)

OTHER PUBLICATIONS

English Translation of CN 103236545.*
English Translation of JP2014086285.*
English Translation of JPH10106542.*

*Primary Examiner* — Kiran Quraishi Akhtar
(74) *Attorney, Agent, or Firm* — Sughrue Mion, PLLC

(57) ABSTRACT

A negative electrode includes at least a negative electrode composite material layer. The negative electrode composite material layer contains at least composite particles and a binder. Each composite particle includes a negative electrode active material particle and a film. The film covers at least part of a surface of the negative electrode active material particle. The film contains a layered silicate mineral. The binder includes nanofibers.

6 Claims, 5 Drawing Sheets

(56) References Cited

FOREIGN PATENT DOCUMENTS

| | | |
|---|---|---|
| JP | 2018-085286 A | 5/2018 |
| WO | 2013/042720 A1 | 3/2013 |
| WO | 2018123324 A1 | 7/2018 |

* cited by examiner

NEGATIVE ELECTRODE, BATTERY, AND METHOD OF PRODUCING NEGATIVE ELECTRODE

This nonprovisional application claims priority to Japanese Patent Application No. 2018-186708 filed on Oct. 1, 2018, with the Japan Patent Office, the entire contents of which are hereby incorporated by reference.

BACKGROUND

Field

The present disclosure relates to a negative electrode, a battery, and a method of producing a negative electrode.

Description of the Background Art

Japanese Patent Laying-Open No. 2018-085286 discloses a negative electrode composite material layer that contains graphite particles, inorganic filler particles, lithium titanium oxide particles, and an aqueous binder.

SUMMARY

Typically, a negative electrode of a battery includes a negative electrode composite material layer. The negative electrode composite material layer contains negative electrode active material particles (such as graphite) and a binder. The negative electrode composite material layer is porous. It is because the space between the negative electrode active material particles is not completely filled. Into the space within the negative electrode composite material layer, an electrolyte solution enters. This allows reaction of the negative electrode active material particles with the electrolyte solution, namely, charge-discharge reaction, to occur within the negative electrode composite material layer.

The negative electrode active material particles swell during charge and shrink during discharge. Accordingly, the negative electrode composite material layer swells during charge and shrinks during discharge. As the entire negative electrode composite material layer thus swells and shrinks, the electrolyte solution present within the negative electrode composite material layer is released from the negative electrode composite material layer. The release of the electrolyte solution from the negative electrode composite material layer may cause nonuniformity in the distribution of the electrolyte solution within the negative electrode composite material layer, resulting in a rise in resistance.

When charge and discharge are carried out at a high rate, the volume change of the negative electrode active material particles may be great. In addition, when charge and discharge are carried out at a high rate, Joule heat may be generated to heat the electrolyte solution and make the electrolyte solution swollen. Therefore, repeated charge and discharge at a high rate (in other words, high-rate cycles) may significantly increase resistance.

Japanese Patent Laying-Open No, 2018-085286 discloses a configuration in which hard small particles (filler) are disposed within space between negative electrode active material particles. In this configuration, the space may tend to remain open to allow the electrolyte solution to enter and, thereby, the electrolyte solution may be distributed throughout the negative electrode composite material layer, alleviating nonuniformity in the distribution of the electrolyte solution. However, it is considered that this configuration still has room for improvement from the viewpoint of mitigating release of the electrolyte solution from the negative electrode composite material layer.

An object of the present disclosure is to mitigate a rise in resistance during high-rate cycles.

In the following, the technical structure and the effects according to the present disclosure are described. It should be noted that the action mechanism according to the present disclosure includes presumption. Therefore, the scope of claims should not be limited by whether or not the action mechanism is correct.

[1] A negative electrode according to the present disclosure includes at least a negative electrode composite material layer. The negative electrode composite material layer contains at least composite particles and a binder. Each composite particle includes a negative electrode active material particle and a film. The film covers at least part of a surface of the negative electrode active material particle. The film contains a layered silicate mineral. The binder includes nanofibers.

FIG. 1 is a conceptual view illustrating the action mechanism of the present disclosure.

The negative electrode composite material layer according to the present disclosure contains composite particles 3. Each composite particle 3 includes a negative electrode active material particle 1 and a film 2. Film 2 contains a layered silicate mineral. The "layered silicate mineral" includes a structure consisting of stacked silicate layers.

To a surface of film 2, a binder 4 is adhered. Binder 4 includes nanofibers. The "nanofiber" refers to a fibrous substance having a diameter not smaller than 1 nm and not greater than 100 nm and a length of at least 100 times the diameter. The nanofibers may link the negative electrode active material particle 1 (or film 2) to one another, in addition, the layered silicate mineral and the nanofibers together may form a composite. This composite formation may occur because, for instance, the structure consisting of stacked silicate layers is readily entangled with the nanofibers.

During discharge, negative electrode active material particles 1 shrink. This may make the composite (of the layered silicate mineral and the nanofibers), which is present between negative electrode active material particles 1, become relatively loosely packed. Therefore, the composite may allow an electrolyte solution to permeate. In other words, the composite may be less likely to inhibit the flow of the electrolyte solution during discharge. As a result, nonuniformity in the distribution of the electrolyte solution within the negative electrode composite material layer may be alleviated.

During charge, negative electrode active material particles 1 swell. The composite of the layered silicate mineral and the nanofibers is compressed between two swollen negative electrode active material particles 1. This may make the composite densely packed. The resulting densely-packed composite has a suitable hardness. Therefore, the densely-packed composite may mitigate the swelling of negative electrode active material particles 1 and, accordingly, mitigate the swelling of the negative electrode composite material layer. In addition, the densely-packed composite may inhibit the flow of the electrolyte solution. These actions may synergistically mitigate release of the electrolyte solution from the negative electrode composite material layer. In other words, a rise in resistance during high-rate cycles may be mitigated.

[2] The layered silicate mineral may be contained in an amount not lower than 0.5 parts by mass and not higher than 1.5 parts by mass relative to 100 parts by mass of the negative electrode active material particles. The binder may be contained in an amount not lower than 1 part by mass and not higher than 2.5 parts by mass relative to 100 parts by mass of the negative electrode active material particles.

With all these conditions being satisfied, a rise in resistance during high-rate cycles may be mitigated and, in addition, initial resistance may decrease.

[3] The layered silicate mineral may contain an aluminosilicate, for example. The layered silicate mineral containing an aluminosilicate may readily form a composite with the nanofibers.

[4] The film may contain a montmorillonite, for example.

The montmorillonite may be a layered silicate mineral containing an aluminosilicate.

[5] The binder may include cellulose nanofibers, for example.

The cellulose nanofibers may function as a binder. The cellulose nanofibers may readily form a composite with the layered silicate mineral.

[6] The negative electrode active material particles may include graphite, for example.

The graphite may function, for example, as a negative electrode active material of a lithium-ion battery.

[7] A battery according to the present disclosure includes at least the negative electrode according to any one of [1] to [6] above, a positive electrode, and an electrolyte solution.

In the battery according to the present disclosure, a rise in resistance during high-rate cycles may be small.

[8] A method of producing a negative electrode according to the present disclosure includes at least (a) and (b) below:

(a) preparing a composite particle by forming a film that covers at least part of a surface of a negative electrode active material particle; and (b) producing a negative electrode by forming a negative electrode composite material layer that contains at least the composite particle and a binder.

The film contains a layered silicate mineral. The binder includes nanofibers.

By the method of producing a negative electrode according to the present disclosure, the negative electrode according to [1] above may be produced. The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. However, the description below does not limit the scope of claims.

For instance, the description below is about a negative electrode for a lithium-ion battery although a negative electrode according to the present embodiment is not limited to a negative electrode for a lithium-ion battery. The negative electrode according to the present embodiment may be, for example, a negative electrode for a sodium-ion battery and/or a negative electrode for a nickel-metal hydride battery.

Negative Electrode

Figure 2:
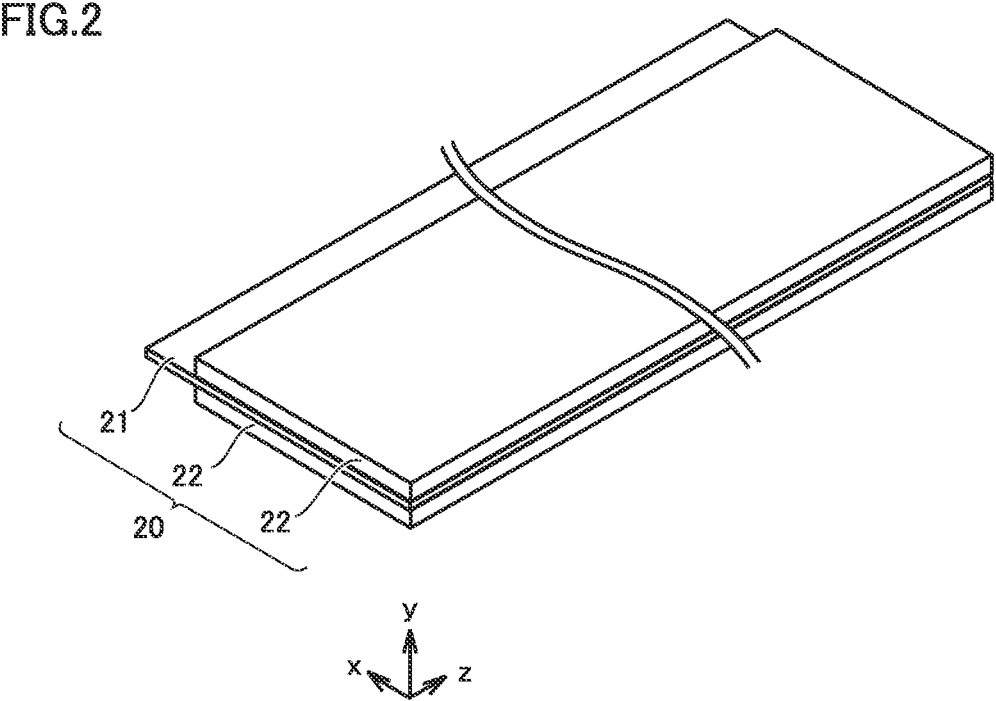
FIG. 2 is a schematic view illustrating the structure of a negative electrode according to the present embodiment.

FIG. 2 is a schematic view illustrating the structure of the negative electrode according to the present embodiment.

A negative electrode 20 is in sheet form. Negative electrode 20 includes at least a negative electrode composite material layer 22. For instance, negative electrode composite material layer 22 may be a self-standing layer. The "self-standing layer" refers to a layer that retains its shape on its own. When negative electrode composite material layer 22 is a self-standing layer, negative electrode 20 may consist essentially of negative electrode composite material layer 22.

For instance, negative electrode composite material layer 22 may be a non-self-standing layer. The "non-self-standing layer" refers to a layer that is supported by a support and cannot retain its shape on its own. The support may be a negative electrode current collector 21, for example. In other words, negative electrode 20 may further include negative electrode current collector 21. Negative electrode current collector 21 is not particularly limited. Negative electrode current collector 21 may be a copper (Cu) foil, for example. The thickness of negative electrode current collector 21 may be not smaller than 5 μm and not greater than 30 μm, for example.

Figure 1:
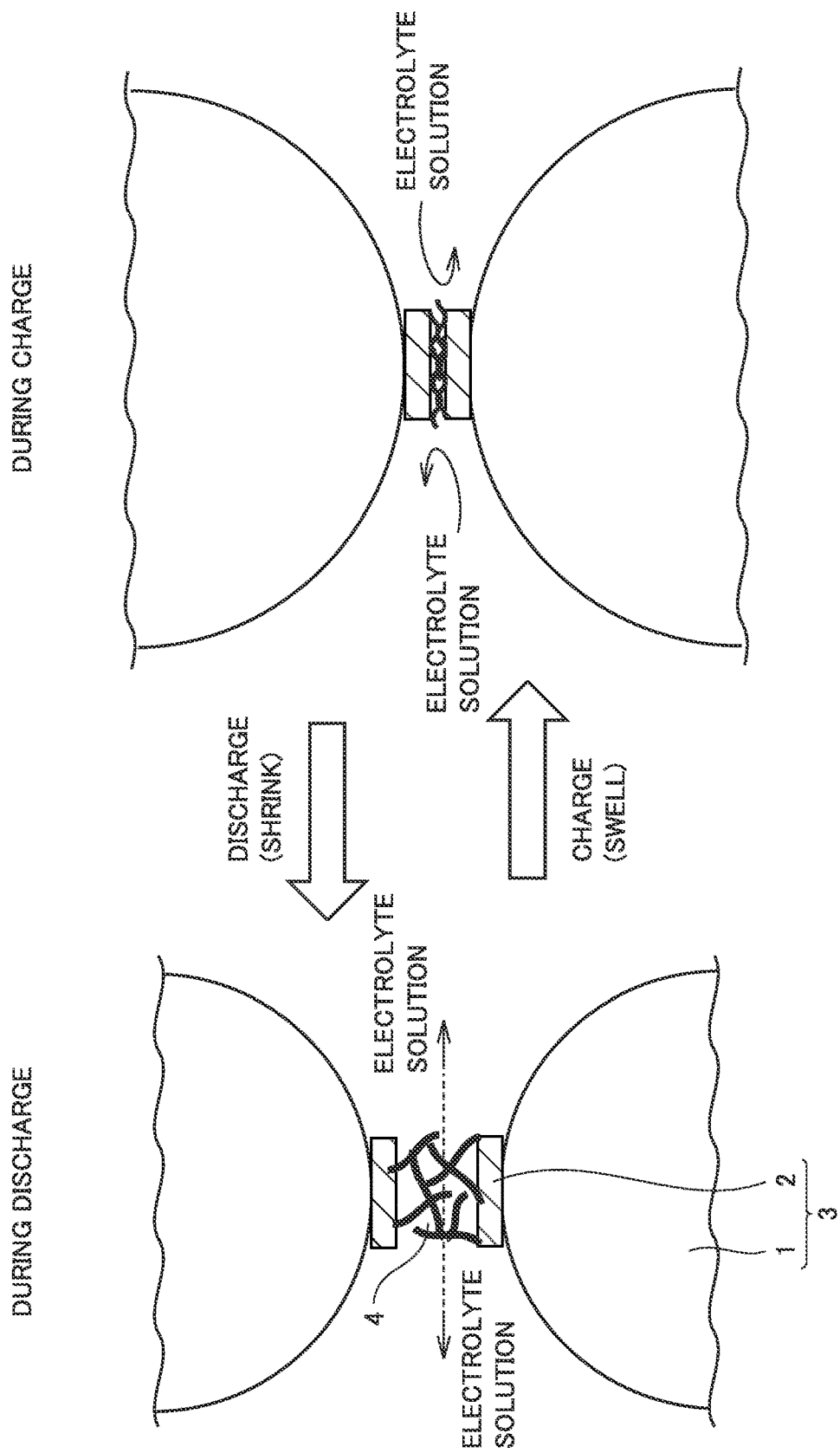
FIG. 1 is a conceptual view illustrating the action mechanism of the present disclosure.

When negative electrode composite material layer 22 is a non-self-standing layer, negative electrode composite material layer 22 may be formed on a surface of negative electrode current collector 21. Negative electrode composite material layer 22 may be formed on only one side of negative electrode current collector 21. Negative electrode composite material layer 22 may be formed on both sides of negative electrode current collector 21. The thickness of negative electrode composite material layer 22 may be not smaller than 10 μm and not greater than 200 μm, for example. The part of negative electrode current collector 21 protruding from negative electrode composite material layer 22 in the x-axis direction in FIG. 2 may be used for connection to a negative electrode terminal 92 (described below). Negative electrode composite material layer 22 contains composite particles 3 and a binder 4 (see FIG. 1).

Composite Particles

Figure 3:
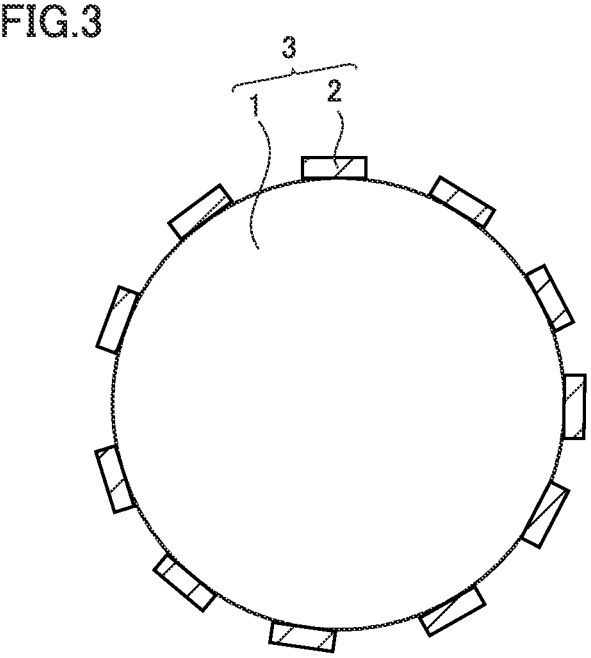
FIG. 3 is a conceptual view illustrating the structure of a composite particle according to the present embodiment.

FIG. 3 is a conceptual view illustrating the structure of the composite particle according to the present embodiment.

Each composite particle 3 includes a negative electrode active material particle 1 and a film 2. The shape of negative electrode active material particle 1 is not particularly limited. Negative electrode active material particle 1 may be a spherical particle, a plate-like particle, and/or a rod-like particle, for example. The size of negative electrode active material particle 1 is not particularly limited. The D50 of negative electrode active material particles 1 may be not lower than 1 μm and not higher than 30 μm, for example. The "D50" refers to a particle size in volume-based particle size distribution at which the cumulative particle volume (accumulated from the side of small sizes) reaches 50% of the total particle volume. The D50 may be measured using a laser-diffraction particle size distribution analyzer.

Negative electrode active material particle 1 includes a negative electrode active material. The negative electrode active material is not particularly limited. The negative electrode active material may be at least one selected from the group consisting of graphite, soft carbon, hard carbon, amorphous carbon, silicon, silicon oxide, silicon-based alloy, tin, tin oxide, tin-based alloy, and lithium titanium oxide, for example. In other words, negative electrode active material particle 1 may include graphite. For instance, negative electrode active material particle 1 may be a composite material consisting of graphite coated with amorphous carbon on its surface.

Film 2 covers at least part of a surface of negative electrode active material particle 1. Film 2 may cover essentially the entire surface of negative electrode active material particle 1. Film 2 may partially cover a surface of negative electrode active material particle 1. In other words, film 2 may cover a part of a surface of negative electrode active material particle 1.

The thickness of film 2 is not particularly limited. The thickness of film 2 may be not smaller than 10 nm and not greater than 5 μm, for example. The thickness of film 2 may be not smaller than 100 nm and not greater than 1 μm, for example. The thickness of film 2 may be measured in, for example, a sectional image of negative electrode composite material layer 22 in a discharged state. For example, the sectional image may be taken with a scanning electron microscope (SEM). The sectional image may be taken with a transmission electron microscope (TEM).

Film 2 contains a layered silicate mineral. Film 2 may consist essentially of the layered silicate mineral. The layered silicate mineral includes a structure consisting of stacked silicate layers. The layered silicate mineral may be in the form of particles, for example. The layered silicate mineral may be plate-like particles, spherical particles, particles in lumps, and/or rod-like particles, for example. The layered silicate mineral may form a composite with nanofibers (described below), which are included within binder 4. During discharge, the composite may become loosely packed and therefore may be less likely to inhibit the flow of an electrolyte solution. As a result, nonuniformity in the distribution of the electrolyte solution within negative electrode composite material layer 22 may be alleviated.

During charge, the composite may become densely packed and therefore may inhibit the flow of the electrolyte solution. Moreover, the densely-packed composite has a suitable hardness. Therefore, the densely-packed composite may mitigate the swelling of negative electrode active material particles 1 and, accordingly, mitigate the swelling of negative electrode composite material layer 22. These actions may synergistically mitigate release of the electrolyte solution from negative electrode composite material layer 22. In other words, a rise in resistance during high-rate cycles may be mitigated.

The thickness of the densely-packed composite may be not smaller than 1 nm and not greater than 500 nm, for example. The thickness of the densely-packed composite may be not smaller than 1 nm and not greater than 300 nm, for example. The thickness of the densely-packed composite may be measured, for example, in a sectional image of negative electrode composite material layer 22 in a charged state.

The layered silicate mineral may contain an aluminosilicate. The aluminosilicate is a silicate compound with some of its silicon (Si) atoms replaced by aluminum (Al) atoms. The layered silicate mineral containing an aluminosilicate may readily form a composite with the nanofibers.

Film 2 may contain at least one selected from the group consisting of montmorillonite, bentonite, and kaolinite, for example. Each of these clay minerals may be a layered silicate mineral containing an aluminosilicate. Film 2 may contain a montmorillonite, for example.

As a material of film 2, a "nanoclay" may be used, for example. A montmorillonite nanoclay may be used, for example. The nanoclay may be plate-like particles. The nanoclay has a thickness of the order of nanometers (nm) and a width of the order of micrometers (μm). The nanoclay has a good dispersibility. The nanoclay is adhesive. By using the nanoclay, the resulting film 2 tends to have a suitable thickness. The thickness of the nanoclay may be not smaller than 10 nm and not greater than 1 μm, for example. The width of the nanoclay may be not smaller than 1 μm and not greater than 5 μm, for example. The thickness and the width of the nanoclay may be measured in an SEM image and/or a TEM image, for example. The width of the nanoclay refers to the maximum width thereof in a plane that is orthogonal to the thickness direction. Each of the thickness measurement and the width measurement of the nanoclay is carried out for at least ten particles of the nanoclay. The average of these at least ten particles is used.

Binder

Binder 4 binds negative electrode active material particle 1 to one another. Binder 4 also binds film 2 to one another. Binder 4 includes nanofibers. Binder 4 may consist essentially of nanofibers. The nanofibers may form a composite with the layered silicate mineral. Binder 4 may include cellulose nanofibers, for example. The cellulose nanofibers may readily form a composite with the layered silicate mineral.

The diameter of the cellulose nanofibers may be not smaller than 1 nm and not greater than 100 nm, for example. The length of the cellulose nanofibers may be not shorter than 1 μm and not longer than 100 μm, for example. The diameter and the length of the cellulose nanofibers may be measured in an SEM image and/or a TEM image, for example. Each of the diameter measurement and the length measurement of the cellulose nanofibers is carried out for at least ten cellulose nanofibers. The average of these at least ten nanofibers is used. In addition to the cellulose nanofibers, binder 4 may include chitin nanofibers, chitosan nanofibers, and/or the like.

The cellulose nanofibers may have been oxidized. In other words, the nanofibers may consist of oxidized cellulose nanofibers. The "oxidized" herein refers to a state in which a hydroxy group in the cellulose molecular chain is oxidized to a carboxy group. Only some of the hydroxy groups in the cellulose molecular chain may be oxidized to carboxy groups. Practically all the hydroxy groups in the cellulose molecular chain may be oxidized to carboxy groups. A carboxy group thus formed in the oxidized cellulose nanofibers may contribute to the formation of a composite with the layered silicate mineral. For the oxidation of cellulose, TEMPO (2,2,6,6-tetramethylpiperidine-1-oxyl radical) may be used, for example. In the present embodiment, oxidized cellulose nanofibers produced by oxidation with TEMPO are called "TEMPO-oxidized cellulose nanofibers".

Contents of Layered Silicate Mineral and Binder

The layered silicate mineral may be contained in an amount not lower than 0.5 parts by mass and not higher than 1.5 parts by mass relative to 100 parts by mass of negative electrode active material particles 1. Binder 4 may be contained in an amount not lower than 1 part by mass and not higher than 2.5 parts by mass relative to 100 parts by mass of negative electrode active material particles 1. With all these conditions being satisfied, a rise in resistance during high-rate cycles may be mitigated and, in addition, initial resistance may decrease.

The layered silicate mineral may be contained in an amount, for example, not lower than 0.5 parts by mass and not higher than 1 part by mass relative to 100 parts by mass of negative electrode active material particles 1. The layered silicate mineral may be contained in an amount, for example, not lower than 0.5 parts by mass and not higher than 0.75 parts by mass relative to 100 parts by mass of negative electrode active material particles 1. With these conditions being satisfied, an effect such as a decrease in initial resistance may be obtained.

Binder 4 may be contained in an amount, for example, not lower than 1 part by mass and not higher than 2 parts by mass relative to 100 parts by mass of negative electrode active material particles 1. Binder 4 may be contained in an amount, for example, not lower than 1 part by mass and not higher than 1.5 parts by mass relative to 100 parts by mass of negative electrode active material particles 1. With these conditions being satisfied, an effect such as a decrease in initial resistance may be obtained.

Additional Component

Negative electrode composite material layer 22 may further contain an additional component as long as it contains composite particles 3 and binder 4. Negative electrode composite material layer 22 may further contain, for example, a conductive material. The conductive material is not particularly limited. The conductive material may be at least one selected from the group consisting of acetylene black (AB), vapor grown carbon fiber (VGCF), and carbon nanotube (CNT), for example. The conductive material may be contained in an amount, for example, not lower than 1 part by mass and not higher than 20 parts by mass relative to 100 parts by mass of negative electrode active material particles 1.

Spring Constant

Negative electrode composite material layer 22 may have a suitable hardness. It may be because negative electrode composite material layer 22 contains a composite of the layered silicate mineral and the nanofibers. The hardness of negative electrode composite material layer 22 may be assessed based on the spring constant of negative electrode 20. It is considered that an increase in the spring constant of negative electrode 20 means an increase in the hardness of negative electrode composite material layer 22. The spring constant of negative electrode 20 may be not lower than 179 kN/mm and not higher than 252 kN/mm, for example. The spring constant of negative electrode 20 may be not lower than 230 kN/mm and not higher than 252 kN/mm, for example.

The spring constant of negative electrode 20 is measured by the procedure below. From negative electrode 20, 30 fragments are cut out. Each fragment has predetermined planar sizes (for example, about 5 cm×about 5 cm). These 30 fragments are stacked on top of another. In this way, a stack sample is prepared. A compression tester is prepared. The compression tester may be, for example, a precision universal tester "Autograph" manufactured by Shimadzu Corporation. The compression tester is operated to apply a load to the stack sample in the stacking direction. Changes in thickness are measured as the load is changed.

The spring constant is calculated by the following equation:

$$\text{Spring constant [unit, kN/mm]} = (\text{load [unit, kN]})/(\text{change in stacking direction [unit, mm]})$$

It is considered that, as the spring constant increases, negative electrode composite material layer 22 becomes less likely to swell. It is also considered that, as the spring constant increases, negative electrode composite material layer 22 becomes less likely to be crushed by the other components within a battery 100 (such as a positive electrode 10), resulting in a mitigated release of the electrolyte solution from negative electrode composite material layer 22.

Method of Producing Negative Electrode

Next, a method of producing a negative electrode according to the present embodiment is described.

Figure 4:
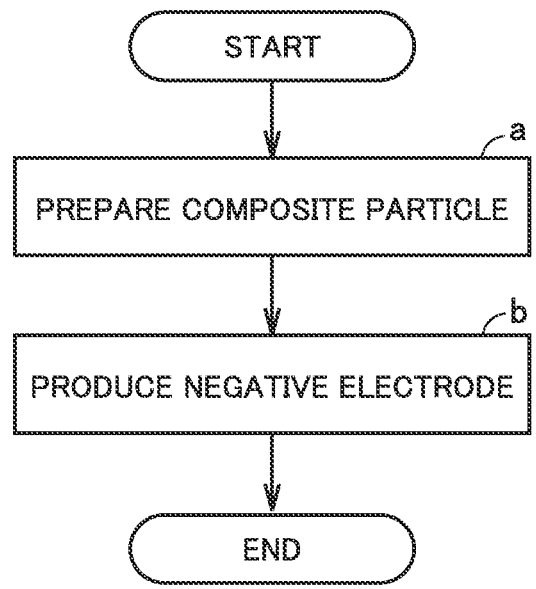
FIG. 4 is a flowchart schematically illustrating a method of producing a negative electrode according to the present embodiment.

FIG. 4 is a flowchart schematically illustrating the method of producing a negative electrode according to the present embodiment.

The method of producing a negative electrode according to the present embodiment includes at least "(a) preparing a composite particle" and "(b) producing a negative electrode".

(a) Preparing Composite Particle

The method of producing a negative electrode according to the present embodiment includes preparing composite particle 3 by forming film 2 that covers at least part of a surface of negative electrode active material particle 1. Film 2 contains a layered silicate mineral.

Negative electrode active material particle 1 and the layered silicate mineral are described above in detail. The layered silicate mineral may be contained in an amount, for example, not lower than 0.5 parts by mass and not higher than 1.5 parts by mass relative to 100 parts by mass of negative electrode active material particles 1.

An example process is described below. Negative electrode active material particles 1 (powder) and the layered silicate mineral (powder) are mixed together. By this mixing, the layered silicate mineral may be made adhere to at least part of a surface of each negative electrode active material particle 1; in other words, at least part of a surface of negative electrode active material particle 1 may be covered with the layered silicate mineral. The mixing may be carried out with a typical stirrer and/or a typical mixer. For example, a high-speed stirring granulator (such as "High Speed Mixer" and "High Flex Gral" manufactured by Earthtechnica Co., Ltd.) and/or a dry particle composing machine (such as "Nobilta" manufactured by Hosokawa Micron Corporation) may be used.

(b) Producing Negative Electrode

The method of producing a negative electrode according to the present embodiment includes producing negative electrode 20 by forming negative electrode composite material layer 22 that contains at least composite particles 3 and binder 4. Binder 4 includes nanofibers.

Negative electrode composite material layer 22 may be formed by paste application, for example. The paste may be prepared by mixing composite particles 3, binder 4, and a solvent. Binder 4 is described above in detail. Binder 4 may be contained in an amount, for example, not lower than 1 part by mass and not higher than 2.5 parts by mass relative to 100 parts by mass of negative electrode active material particles 1. The solvent may be water, for example. The mixing may be carried out with a typical stirrer and/or a typical mixer. For example, a planetary mixer and/or a high-speed stirring granulator may be used.

Negative electrode current collector 21 is prepared. Negative electrode current collector 21 is described above in detail. The paste is applied to a surface of negative electrode current collector 21, followed by drying, and thus negative electrode composite material layer 22 may be formed. The applying may be carried out with a typical applicator, for example. A die coater may be used, for example. The drying may be carried out with a typical dryer. For example, a hot-air dryer may be used.

In this way, a negative electrode raw sheet is produced. The resulting negative electrode raw sheet is processed into predetermined dimensions, and thus negative electrode 20 is produced. The processing herein may include rolling, cutting, and the like.

Battery

Next, a battery according to the present embodiment is described.

Figure 5:
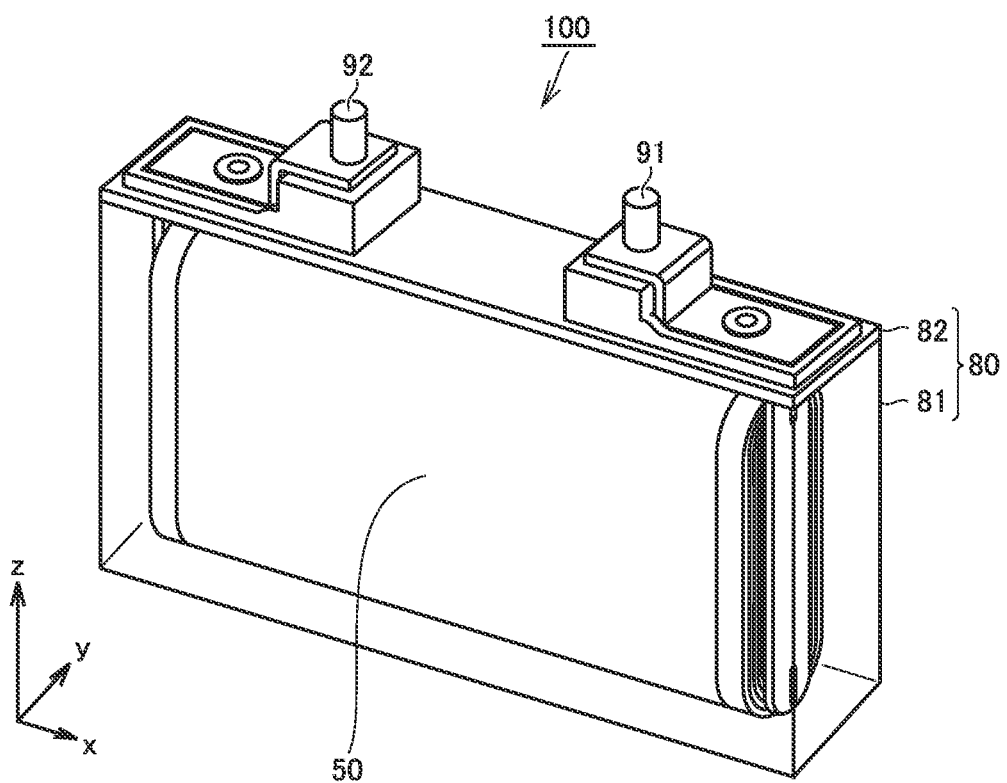
FIG. 5 is a schematic view illustrating the structure of a battery according to the present embodiment.

FIG. 5 is a schematic view illustrating the structure of the battery according to the present embodiment.

Battery 100 is a lithium-ion battery. Battery 100 includes a casing 80. Casing 80 may be made of Al alloy, for example. Casing 80 is prismatic (a flat, rectangular parallelepiped). However, the shape of casing 80 is not particularly limited. Casing 80 may be cylindrical, for example. Casing 80 may be, for example, a pouch made of Al-laminated film.

Casing 80 includes a container 81 and a cap 82. Cap 82 is bonded to container 81 by laser beam welding, for example. Cap 82 is equipped with a positive electrode terminal 91 and negative electrode terminal 92. Cap 82 may be further equipped with a liquid inlet, a gas-discharge valve, a current interrupt device (CID), and the like. Casing 80 accommodates an electrode array 50 and an electrolyte solution (not shown).

Figure 6:
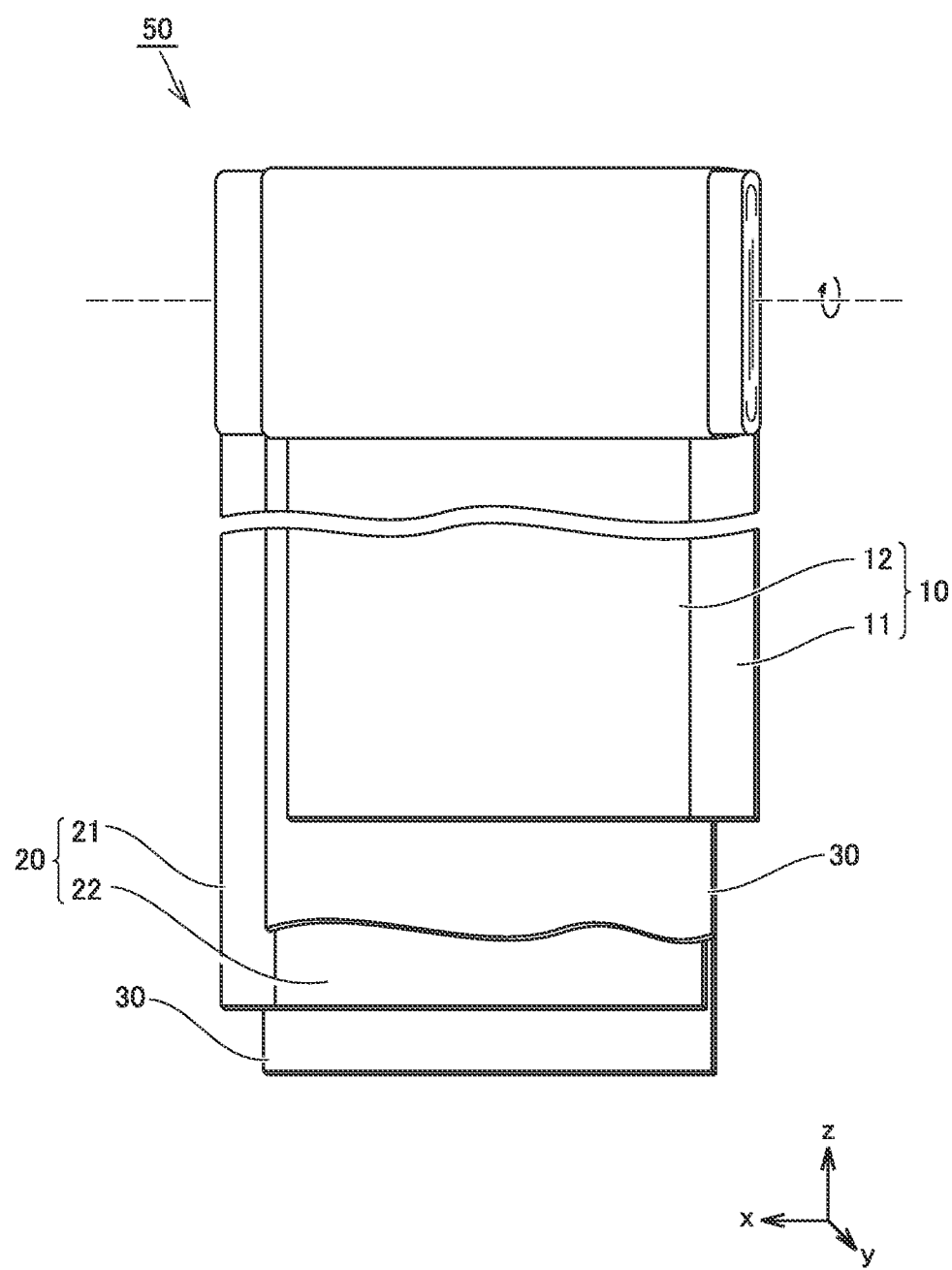
FIG. 6 is a schematic view illustrating the structure of an electrode array according to the present embodiment.

FIG. 6 is a schematic view illustrating the structure of the electrode array according to the present embodiment.

Electrode array 50 is a wound-type one. Electrode array 50 is formed by stacking positive electrode 10, a separator 30, negative electrode 20, and separator 30 in this order and then winding them in a spiral fashion. Into electrode array 50, the electrolyte solution is made permeated. In other words, battery 100 includes at least negative electrode 20, positive electrode 10, and the electrolyte solution. Negative electrode 20 is described above in detail. In battery 100 thus including negative electrode 20 according to the present embodiment, a rise in resistance during high-rate cycles may be small.

Electrode array 50 may be a stack-type one. More specifically, electrode array 50 may be formed by alternately stacking one positive electrode 10 and one negative electrode 20 and then repeating this alternate stacking process more than once. In each space between positive electrode 10 and negative electrode 20, separator 30 is interposed.

Positive Electrode

Figure 7:
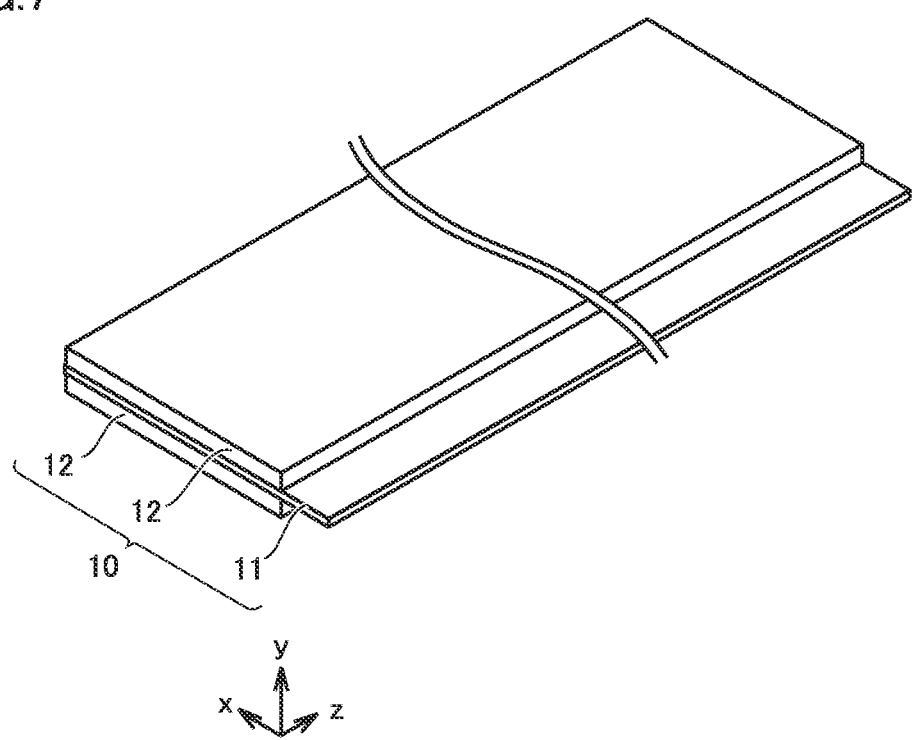
FIG. 7 is a schematic view illustrating the structure of a positive electrode according to the present embodiment.

FIG. 7 is a schematic view illustrating the structure of the positive electrode according to the present embodiment.

Positive electrode 10 is in sheet form. Positive electrode 10 includes at least a positive electrode composite material layer 12. Positive electrode 10 may further include a positive electrode current collector 11. Positive electrode composite material layer 12 may be formed on a surface of positive electrode current collector 11. Positive electrode current collector 11 is not particularly limited. Positive electrode current collector 11 may be an Al foil, for example. The thickness of positive electrode current collector 11 may be not smaller than 5 µm and not greater than 30 µm, for example.

Positive electrode composite material layer 12 may be formed on only one side of positive electrode current collector 11. Positive electrode composite material layer 12 may be formed on both sides of positive electrode current collector 11. The thickness of positive electrode composite material layer 12 may be not smaller than 10 µm and not greater than 200 µm, for example. The part of positive electrode current collector 11 protruding from positive electrode composite material layer 12 in the x-axis direction in FIG. 7 may be used for connection to positive electrode terminal 91.

Positive electrode composite material layer 12 contains at least positive electrode active material particles. The D50 of the positive electrode active material particles may be not lower than 1 µm and not higher than 30 µm, for example. The positive electrode active material particles include a positive electrode active material. The positive electrode active material is not particularly limited. The positive electrode active material may be at least one selected from the group consisting of lithium cobalt oxide ($LiCoO_2$), lithium nickel oxide ($LiNiO_2$), lithium manganese oxide (such as $LiMnO_2$ and $LiMn_2O_4$), lithium nickel cobalt manganese oxide (such as $LiNi_{1/3}Co_{1/3}Mn_{1/3}O_2$ and $LiNi_{0.5}Co_{0.2}Mn_{0.3}O_2$), lithium nickel cobalt aluminate (such as $LiNi_{0.82}Co_{0.15}Al_{0.03}O_2$), and lithium iron phosphate ($LiFePO_4$), for example.

Positive electrode composite material layer 12 may further contain a conductive material. The conductive material is not particularly limited. The conductive material may be AB, for example. The conductive material may be contained in an amount, for example, not lower than 1 part by mass and not higher than 10 parts by mass relative to 100 parts by mass of the positive electrode active material particles. Positive electrode composite material layer 12 may further contain a binder. The binder is not particularly limited. The binder may be polyvinylidene difluoride (PVDF), for example. The binder may be contained in an amount, for example, not lower than 1 part by mass and not higher than 10 parts by mass relative to 100 parts by mass of the positive electrode active material particles.

Separator

Battery 100 may include separator 30. Separator 30 is interposed between positive electrode 10 and negative electrode 20. Separator 30 separates positive electrode 10 from negative electrode 20. Separator 30 is a porous film. Separator 30 is electrically insulating. The thickness of separator 30 may be not smaller than 5 μm and not greater than 50 μm, for example. Separator 30 may be made of polyolefin, for example.

Separator 30 may be made of polyethylene (PE), for example. Separator 30 may be made of polypropylene (PP), for example. Separator 30 may have a monolayer structure, for example. Separator 30 may consist of a porous PE film, for example. Separator 30 may have a multilayer structure, for example. Separator 30 may be formed by, for example, stacking a porous PP film, a porous PE film, and a porous PP film in this order. Separator 30 may have a heat-resistant layer on its surface. The heat-resistant layer contains a heat-resistant material. The heat-resistant material may be alumina, boehmite, titania, silica, and/or polyimide, for example.

Electrolyte Solution

The electrolyte solution contains a lithium (Li) salt and a solvent. The Li salt is dissolved in the solvent. The concentration of the Li salt may be not lower than 0.5 mat and not higher than 2 mol/L (not lower than 0.5 M and not higher than 2 M), for example. The Li salt may be at least one selected from the group consisting of $LiPF_6$, $LiBF_4$, $LiN(FSO_2)_2$, and $LiN(CF_3SO_2)_2$, for example.

The solvent is aprotic. The solvent may contain a cyclic carbonate and a chain carbonate, for example. The mixing ratio of the cyclic carbonate and the chain carbonate may be "(cyclic carbonate)/(chain carbonate)=1/9 to 5/5 (volume ratio)", for example.

The cyclic carbonate may be at least one selected from the group consisting of ethylene carbonate (EC), propylene carbonate (PC), butylene carbonate (BC), and fluoroethylene carbonate (FEC), for example.

The chain carbonate may be at least one selected from the group consisting of dimethyl carbonate (DMC), ethyl methyl carbonate (EMC), and diethyl carbonate (DEC), for example.

The solvent may contain a lactone, a cyclic ether, a chain ether, and/or a carboxylate ester, for example. The lactone may be γ-butyrolactone (GBL) and/or δ-valerolactone (DVL), for example. The cyclic ether may be tetrahydrofuran (THF), 1,3-dioxolane (DOL), and/or 1,4-dioxane (DX), for example. The chain ether may be 1,2-dimethoxyethane (DME), for example. The carboxylate ester may be methyl formate (MF), methyl acetate (MA), and/or methyl propionate (MP), for example.

In addition to the Li salt and the solvent, the electrolyte solution may further contain various additive agents. The concentration of the additive agents may be not lower than 0.005 mol/L and not higher than 0.5 mol/L, for example. The additive agents may be a gas generation agent (the so-called anti-overcharging additive), a solid electrolyte interface (SEI) film-forming agent, and a flame retardant, for example.

The gas generation agent may be cyclohexylbenzene (CHB) and/or biphenyl (BP), for example. The SEI-film-forming agent may be vinylene carbonate (VC), vinylethylene carbonate (VEC), $LiB(C_2O_4)_2$, $LiBF_2(C_2O_4)$, $LiPF_2(C_2O_4)_2$, $LiPO_2F_2$, propane sultone (PS), and/or ethylene sulfite (ES), for example. The flame retardant may be phosphazene, for example. The electrolyte solution may contain only one type of the additive agents. The electrolyte solution may contain two or more types of the additive agents.

EXAMPLES

Next, examples according to the present disclosure are described. However, the description below does not limit the scope of claims.

Producing Negative Electrode and Battery

Example 1

1. Producing Negative Electrode
1-1. (a) Preparing Composite Particle
The materials described below were prepared.
Negative electrode active material particles: graphite
Layered silicate mineral: montmorillonite nanoclay (thickness=about 10 nm to about 1 μm, width=about 1 μm to about 5 μm)
Binder: TEMPO-oxidized cellulose nanofibers (TOCNF)
Solvent: Water
Negative electrode current collector: Cu foil (thickness, 10 μm) Negative electrode active material particles 1 (powder) and the layered silicate mineral (powder) were mixed, and thus film 2 was formed on at least part of a surface of each negative electrode active material particle 1. In this way, composite particles 3 (powder) were prepared. The amount of the layered silicate mineral used was 0.5 parts by mass relative to 100 parts by mass of negative electrode active material particles 1. The mixing was carried out with a high-speed stirring granulator. The number of revolutions of the chopper blades of the high-speed stirring granulator was set at 4000 rpm.

1-2. (b) Producing Negative Electrode
Composite particles 3, binder 4, and a solvent were mixed, and thus a paste was prepared. The amount of binder 4 used was 1 part by mass relative to 100 parts by mass of negative electrode active material particles 1. The mixing was carried out with a high-speed stirring granulator.

The paste was applied to a surface of negative electrode current collector 21, followed by drying, and thus negative electrode composite material layer 22 was formed. In this way, a negative electrode raw sheet was produced. The resulting negative electrode raw sheet was processed into predetermined dimensions, and thus negative electrode 20 was produced.

2. Producing Positive Electrode
The materials described below were prepared.
Positive electrode active material particles: lithium nickel cobalt manganese oxide
Conductive material: AB
Binder: PVDF
Solvent: N-methyl-2-pyrrolidone (NMP)
Positive electrode current collector Al foil (thickness, 15 μm)
The positive electrode active material particles, the conductive material, the binder, and the solvent were mixed, and thus a paste was prepared. The solid flatter ratio was "(positive electrode active material particles):(conductive material):(binder)=100:8:2 (mass ratio)". The paste was applied to a surface of positive electrode current collector 11, followed by drying, and thus positive electrode composite material layer 12 was formed. In this way, a positive electrode raw sheet was produced. The resulting positive electrode raw sheet was processed into predetermined dimensions, and thus positive electrode 10 was produced.

3. Assembly

Separator 30 was prepared. Separator 30 had a heat-resistant layer formed on one side thereof. Positive electrode 10, separator 30, negative electrode 20, and separator 30 were stacked in this order and then wound in a spiral fashion. In this way, electrode array 50 was formed. Within electrode array 50, the heat-resistant layer was positioned facing negative electrode 20. Casing 80 was prepared. Each of positive electrode terminal 91 and negative electrode terminal 92 was connected to electrode array 50. Electrode array 50 was placed in casing 80.

4. Injection

Into casing 80, an electrolyte solution was injected. After the injection of the electrolyte solution, casing 80 was hermetically sealed. The electrolyte solution consisted of components described below.

Li salt: $LiPF_6$ (concentration, 1 mol/L)

Solvent: [EC/DMC/EMC=30/35/35 (volume ratio)]

In this way, battery 100 (prismatic lithium-ion battery) was produced. Battery 100 had a rated capacity of 4 Ah within a voltage range of 3 to 4.1 V.

5. Initial Charge and Discharge

Battery 100 was charged to 4.1 V at a current of 4 A. After charge, battery 100 was discharged to 3 V at a current of 4 A.

Examples 2 to 4

Negative electrode 20 and battery 100 were produced in the same manner as in Example 1 except that the content of binder 4 was changed as specified in Table 1 below. Then, initial charge and discharge of battery 100 was carried out.

Examples 5 to 7

Negative electrode 20 and battery 100 were produced in the same manner as in Example 1 except that the content of the layered silicate mineral was changed as specified in Table 1 below. Then, initial charge and discharge of battery 100 was carried out.

Examples 8 and 9

Negative electrode 20 and battery 100 were produced in the same manner as in Example 1 except that the content of binder 4 was changed as specified in Table 1 below. Then, initial charge and discharge of battery 100 was carried out.

Examples 10 and 11

Negative electrode 20 and battery 100 were produced in the same manner as in Example 1 except that the content of the layered silicate mineral was changed as specified in Table 1 below. Then, initial charge and discharge of battery 100 was carried out.

Comparative Example 1

As a binder, carboxymethylcellulose (CMC) and styrene-butadiene rubber (SBR) were prepared. Neither CMC nor SBR included nanofibers. Negative electrode active material particle 1, the binder, and a solvent were mixed, and thus a paste was prepared. The amount of the binder used relative to 100 parts by mass of negative electrode active material particles 1 was 2 parts by mass, with a breakdown of 1 part by mass of CMC and 1 part by mass of SBR. Except these conditions, the same manner as in Example 1 was adopted to produce negative electrode 20 and battery 100. Then, initial charge and discharge of battery 100 was carried out.

In Comparative Example 1, film 2 was not formed on a surface of negative electrode active material particle 1. In Comparative Example 1, hinder 4 including nanofibers was not used.

Comparative Example 2

Negative electrode 20 and battery 100 were produced in the same manner as in Comparative Example 1 except that, as specified in Table 1 below, 2 parts by mass of TOCNF was used instead of the combination of CMC and SBR (2 parts by mass in total). Then, initial charge and discharge of battery 100 was carried out.

In Comparative Example 2, film 2 was not formed on a surface of negative electrode active material particle 1.

Comparative Example 3

As a filler, alumina was prepared. Except that the filler was added to the paste of Comparative Example 1, the same manner as in Comparative Example 1 was adopted to produce negative electrode 20 and battery 100. Then, initial charge and discharge of battery 100 was carried out. The amount of the filler used was 1 part by mass relative to 100 parts by mass of negative electrode active material particles 1.

In Comparative Example 3, film 2 was not formed on a surface of negative electrode active material particle 1. In Comparative Example 3, the filler (alumina) was dispersed within negative electrode composite material layer 22. In Comparative Example 3, binder 4 including nanofibers was not used.

Comparative Example 4

Negative electrode 20 and battery 100 were produced in the same manner as in Comparative Example 2 except that a montmorillonite nanoclay was added to the paste of Comparative Example 2. Then, initial charge and discharge of battery 100 was carried out.

In Comparative Example 4, film 2 was not formed on a surface of negative electrode active material particle 1. The layered silicate mineral was dispersed within negative electrode composite material layer 22.

Comparative Example 5

Negative electrode 20 and battery 100 were produced in the same manner as in Example 6 except that, as specified in Table 1 below, 1 part by mass of CMC and 1 part by mass of SBR (2 parts by mass in total) were used instead of 1 part by mass of TOCNF. Then, initial charge and discharge of battery 100 was carried out.

In Comparative Example 5, binder 4 including nanofibers was not used.

Evaluation

Spring Constant

According to the procedure described above, the spring constant of negative electrode 20 was measured. Results are shown in Table 1 below.

Initial Resistance

The voltage of battery 100 was adjusted to 3.7 V. Battery 100 was discharged at a current of 40 A for ten seconds in a thermostatic chamber set at 25° C. The level of voltage drop caused in the ten seconds elapsed after the start of the discharging was measured. Resistance was calculated by the following equation:

Resistance [unit, $\Omega$]=(Level of voltage drop [unit, V])/(discharge current [unit, A])

Results are shown in Table 1 below.

Rate of Rise in Resistance During High-Rate Cycles

The state of charge (SOC) of battery 100 was adjusted to 60%. 1,000 cycles of charge and discharge were carried out in a thermostatic chamber set at 25° C. A single cycle consisted of a sequence of charge and discharge as specified below.

Charge: current=80 A, charge duration=40 seconds, voltage upper limit=4.3 V

Discharge: current=8 A, charge duration=400 seconds, voltage lower limit=2.5 V

Resistance was measured after the first cycle. Resistance was measured after the 1,000th cycle. The rate of rise in resistance was calculated by the following equation:

Rate of rise in resistance [unit, %]=(resistance after 1,000th cycle [unit, $\Omega$])/(resistance after first cycle [unit, $\Omega$])×100

Results are shown in Table 1 below. The lower the rate of rise in resistance is, the more mitigated a rise in resistance during high-rate cycles may have been.

TABLE 1

| | Negative electrode | | | | | | | | Battery | | |
|---|---|---|---|---|---|---|---|---|---|---|---|
| | Negative electrode composite material layer | | | | | | | | | | |
| | Composite particles | | | | | | | | | | High-rate |
| | Negative | Film | | Binder | | Other (filler) | | | | Initial | cycles |
| | electrode active material particles | Material (layered silicate mineral, etc.) | Content [parts by mass] | Material | Content [parts by mass] | Material | Content [parts by mass] | Covering treatment | Spring constant [kN/mm] | resistance 10-second discharge [m$\Omega$] | Rate of rise in resistance [%] |
| Ex. 1 | Graphite | Montmorillonite | 0.5 | TOCNF | 1 | — | — | Yes | 231 | 2.1 | 106 |
| Ex. 2 | Graphite | Montmorillonite | 0.5 | TOCNF | 1.5 | — | — | Yes | 238 | 2.0 | 108 |
| Ex. 3 | Graphite | Montmorillonite | 0.5 | TOCNF | 2 | — | — | Yes | 233 | 2.2 | 116 |
| Ex. 4 | Graphite | Montmorillonite | 0.5 | TOCNF | 2.5 | — | — | Yes | 230 | 2.4 | 118 |
| Ex. 5 | Graphite | Montmorillonite | 0.75 | TOCNF | 1 | — | — | Yes | 233 | 2.2 | 112 |
| Ex. 6 | Graphite | Montmorillonite | 1 | TOCNF | 1 | — | — | Yes | 252 | 2.3 | 103 |
| Ex. 7 | Graphite | Montmorillonite | 1.5 | TOCNF | 1 | — | — | Yes | 245 | 2.4 | 104 |
| Comp. Ex. 1 | Graphite | — | — | CMC/SBR | 1/1* | — | — | — | 153 | 2.3 | 195 |
| Comp. Ex. 2 | Graphite | — | — | TOCNF | 2 | — | — | — | 158 | 2.0 | 189 |
| Comp. Ex. 3 | Graphite | — | — | CMC/SBR | 1/1 | Alumina | 1 | No | 160 | 3.0 | 185 |
| Comp. Ex. 4 | Graphite | — | — | TOCNF | 2 | Montmorillonite | 1 | No | 162 | 3.2 | 179 |
| Comp. Ex. 5 | Graphite | Montmorillonite | 1 | CMC/SBR | 1/1 | — | — | Yes | 165 | 2.6 | 182 |
| Ex. 8 | Graphite | Montmorillonite | 0.5 | TOCNF | 3 | — | — | Yes | 225 | 4.3 | 165 |
| Ex. 9 | Graphite | Montmorillonite | 0.5 | TOCNF | 0.5 | — | — | Yes | 179 | 2.3 | 175 |
| Ex. 10 | Graphite | Montmorillonite | 0.1 | TOCNF | 1 | — | — | Yes | 185 | 2.4 | 170 |
| Ex. 11 | Graphite | Montmorillonite | 2 | TOCNF | 1 | — | — | Yes | 218 | 4.1 | 158 |

*CMC = 1 part by mass, SBR = 1 part by mass

Results

In Examples 1 to 11, the rate of rise in resistance is low compared to Comparative Examples 1 to 5. In other words, a rise in resistance during high-rate cycles was mitigated. In Examples 1 to 11, at least part of a surface of negative electrode active material particle 1 was covered with film 2. Film 2 contained a layered silicate mineral (montmorillonite nanoclay). Moreover, in Examples 1 to 11, binder 4 included nanofibers (TOCNF). The layered silicate mineral and the nanofibers may have formed a composite within negative electrode composite material layer 22. The composite may have become loosely packed during discharge and densely packed during charge. Therefore, nonuniformity in the distribution of the electrolyte solution within negative electrode composite material layer 22 may have been alleviated and release of the electrolyte solution from negative electrode composite material layer 22 may have been mitigated. These phenomena may have been the cause of the mitigation of rise in resistance during high-rate cycles.

In Examples 1 to 11, the spring constant tends to be high compared to Comparative Examples 1 to 5. In other words, in Examples 1 to 11, the hardness of negative electrode 20 may have been increased. Although positive electrode 10 also swelled and shrank during high-rate cycles, Examples 1 to 11 had hard negative electrode 20 which may have been less likely to be crushed by swollen positive electrode 10. This phenomenon may have also contributed to the mitigated release of the electrolyte solution from negative electrode composite material layer 22.

In Examples 1 to 7, the rate of rise in resistance tends to be low compared to Examples 8 to 11. In Examples 1 to 7, the content of the layered silicate mineral was not lower than 0.5 parts by mass and not higher than 1.5 parts by mass relative to 100 parts by mass of the negative electrode active material particles. Moreover, in Examples 1 to 7, the content of the binder was not lower than 1 part by mass and not higher than 2.5 parts by mass relative to 100 parts by mass of negative electrode active material particles 1.

Results of Examples 7 and 11 illustrate the following tendencies: when the content of the layered silicate mineral was not higher than 1.5 parts by mass, a rise in resistance during high-rate cycles was mitigated; and when the content of the layered silicate mineral was not higher than 1.5 parts by mass, initial resistance was low. These tendencies may have been exhibited because, when the content of the layered silicate mineral was not higher than 1.5 parts by mass, the composite may have been less likely to inhibit the flow of Li ions.

Results of Examples 1 and 10 illustrate the following tendencies: when the content of the layered silicate mineral was not lower than 0.5 parts by mass, a rise in resistance during high-rate cycles was mitigated; and when the content of the layered silicate mineral was not lower than 0.5 parts by mass, the spring constant was high. These tendencies may have been exhibited because, when the content of the layered silicate mineral was not lower than 0.5 parts by mass, the composite may have been more densely packed.

Results of Examples 4 and 8 illustrate the following tendencies: when the content of binder 4 was not higher than 2.5 parts by mass, a rise in resistance during high-rate cycles was mitigated; and when the content of binder 4 was not higher than 2.5 parts by mass, initial resistance was low. These tendencies may have been exhibited because, when the content of binder 4 was not higher than 2.5 parts by mass, the composite may have been less likely to inhibit the flow of Li ions.

Results of Examples 1 and 9 illustrate the following tendencies: when the content of binder 4 was not lower than 1 part by mass, a rise in resistance during high-rate cycles was mitigated; and when the content of binder 4 was not lower than 1 part by mass, the spring constant was high. These tendencies may have been exhibited because, when the content of binder 4 was not lower than 1 part by mass, the composite may have been more densely packed.

In Comparative Example 4, a layered silicate mineral and nanofibers were used. In Comparative Example 4, however, the rate of rise in resistance during high-rate cycles was high. In Comparative Example 4, covering treatment was not carried out and therefore the layered silicate mineral was not disposed on a surface of negative electrode active material particle 1. Therefore, a densely-packed composite may have not been formed between negative electrode active material particles 1. Moreover, Comparative Example 4 had a high initial resistance. This may be because the layered silicate mineral served as a filler and filled the space within negative electrode composite material layer 22 and, as a result, the flow of the electrolyte solution during discharge may have been inhibited.

In Comparative Examples 2 and 5, the rate of rise in resistance during high-rate cycles was high. In Comparative Example 2, a layered silicate mineral was not used. In Comparative Example 2, film 2 was not formed. In Comparative Example 5, nanofibers were not used. Therefore, it may be concluded that the effect (namely, mitigation of rise in resistance during high-rate cycles) attained in the examples described above is unique to a configuration in which a layered silicate mineral covers a surface of negative electrode active material particle 1 and nanofibers are used.

The embodiments and examples disclosed herein are illustrative and non-restrictive in any respect. The technical scope indicated by the claims encompasses any modifications within the scope and meaning equivalent to the terms of the claims.

What is claimed is:

1. A negative electrode comprising at least:
   a negative electrode composite material layer,
   the negative electrode composite material layer containing at least composite particles and a binder,
   each composite particle including a negative electrode active material particle and a film,
   the film covering at least part of a surface of the negative electrode active material particle,
   the film containing a layered silicate mineral containing an aluminosilicate,
   the binder including oxidized cellulose nanofibers,
   the layered silicate mineral is contained in an amount not lower than 0.5 parts by mass and not higher than 1.5 parts by mass relative to 100 parts by mass of the negative electrode active material particles, and
   the binder is contained in an amount not lower than 1 part by mass and not higher than 2.5 parts by mass relative to 100 parts by mass of the negative electrode active material particles,
   the oxidized cellulose nanofibers comprises cellulose molecular chains having carboxy groups, and
   the carboxy groups form a composite with the layered silicate mineral.

2. The negative electrode according to claim 1, wherein the film contains a montmorillonite.

3. The negative electrode according to claim 1, wherein the negative electrode active material particle includes graphite.

4. A battery comprising at least:
   the negative electrode according to claim 1;
   a positive electrode; and
   an electrolyte solution.

5. A method of producing a negative electrode, comprising at least:
   preparing a composite particle by forming a film that covers at least part of a surface of a negative electrode active material particle; and
   producing a negative electrode by forming a negative electrode composite material layer that contains at least a plurality of the composite particle and a binder,
   the film containing a layered silicate mineral containing an aluminosilicate,
   the binder including oxidized cellulose nanofibers,
   the layered silicate mineral is contained in an amount not lower than 0.5 parts by mass and not higher than 1.5 parts by mass relative to 100 parts by mass of the negative electrode active material particles, and
   the binder is contained in an amount not lower than 1 part by mass and not higher than 2.5 parts by mass relative to 100 parts by mass of the negative electrode active material particles, the oxidized cellulose nanofibers comprises cellulose molecular chains having carboxy groups, and the carboxy groups form a composite with the layered silicate mineral.

6. The negative electrode according to claim 1, wherein the film contains a montmorillonite, and the montmorillonite is the only aluminosilicate in the film.

\* \* \* \* \*